United States Patent
Romas et al.

(10) Patent No.: US 9,293,284 B1
(45) Date of Patent: Mar. 22, 2016

(54) SOFT-SWITCHING GATE CONTROL

(71) Applicant: Lockheed Martin Corporation, Bethesda, MD (US)

(72) Inventors: Gregory Romas, Coppell, TX (US); David Hoelscher, Arlington, TX (US); Daniel Homiak, Waxahachie, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 622 days.

(21) Appl. No.: 13/682,227

(22) Filed: Nov. 20, 2012

Related U.S. Application Data

(60) Provisional application No. 61/562,976, filed on Nov. 22, 2011.

(51) Int. Cl.
| | | |
|---|---|---|
| *H01H 19/64* | (2006.01) | |
| *H01H 31/10* | (2006.01) | |
| *H01H 33/59* | (2006.01) | |
| *H01H 47/00* | (2006.01) | |
| *H01H 85/46* | (2006.01) | |

(52) U.S. Cl.
CPC ................................. *H01H 47/00* (2013.01)

(58) Field of Classification Search
CPC ...... H01H 33/596; H01H 47/00; H01H 9/548; H01H 1/0036; H01H 2009/543; H01H 2057/006; H01H 47/002; H01H 59/0009; H01H 9/00; H01H 9/541; H01H 9/542; H01H 11/00; H01H 13/70; H01H 1/0094
USPC .......................................................... 307/113
See application file for complete search history.

(56) References Cited

U.S. PATENT DOCUMENTS

| | | | | |
|---|---|---|---|---|
| 4,410,855 | A * | 10/1983 | Underhill et al. | 327/561 |
| 5,118,963 | A * | 6/1992 | Gesin | 307/116 |
| 7,170,195 | B2 * | 1/2007 | Haensel et al. | 307/43 |
| 7,936,087 | B2 * | 5/2011 | Yang et al. | 307/11 |
| 8,363,441 | B2 * | 1/2013 | Ohashi et al. | 363/132 |
| 2008/0232138 | A1* | 9/2008 | Yang et al. | 363/17 |
| 2009/0009246 | A1* | 1/2009 | Hara et al. | 330/254 |

* cited by examiner

*Primary Examiner* — Jared Fureman
*Assistant Examiner* — Esayas Yeshaw
(74) *Attorney, Agent, or Firm* — Withrow & Terranova, PLLC

(57) ABSTRACT

Soft-switching gate control circuitry is disclosed. The circuitry includes a first discharge circuit coupled across a first switching device. A first control circuit, upon a first switch input signal transitioning from a disabled state to an enabled state, is adapted to cause the first discharge circuit to transition from a high impedance state to a discharge impedance state, and when a voltage across the first switching device drops below a first threshold value, cause the first switching device to transition from an off state to an on state.

20 Claims, 6 Drawing Sheets

SOFT-SWITCHING GATE CONTROL

RELATED APPLICATION

This application claims the benefit of provisional patent application Ser. No. 61/562,976, filed Nov. 22, 2011, the disclosure of which is hereby incorporated herein by reference in its entirety.

TECHNICAL FIELD

The embodiments relate to circuitry, and in particular to circuitry that is adapted to discharge parasitic voltages prior to closing a switch.

BACKGROUND

A power converter dissipates a relatively large amount of power upon transistor opening and closing during power cycles. If the power being dissipated is too large, semiconductor devices may over-heat, or otherwise become stressed, and become damaged. One mechanism to reduce the need to dissipate such power is to switch the transistors at intervals where the power would be the smallest, sometimes referred to as zero voltage switching (ZVS), or zero current switching (ZCS).

"High-power" power converters often use insulated-gate bipolar transistor (IGBT) modules, which have relatively large voltage ratings, but are typically limited to switching frequencies of less than two kilohertz (kHz). IGBTs also have relatively large voltage drops, and are thus inherently inefficient. Because IGBTs are unidirectional, IGBTs are relatively immune to oscillations.

Metal oxide semiconductor field-effect transistors (MOSFETs) facilitate relatively high switching frequencies and relatively high power densities. For example, silicon carbide (SiC) MOSFETs have voltage ratings of up to 1200 volts (V), and gallium nitride (GaN) MOSFETs have voltage ratings of up to 600V. MOSFETs also facilitate switching frequencies in excess of 100 kHz, and are relatively efficient because the voltage drop is primarily limited only by Drain-to-Source On Resistance (RDSon).

Higher switching frequencies reduce the timing window for ZVS. Accordingly, the drive signals that drive the gate of the MOSFET must be relatively fast, and the timing relatively accurate. MOSFETs are bidirectional devices, such that when a MOSFET is in an on state it exhibits a relatively low impedance in each direction through the device. Accordingly, circuits that use MOSFETs are susceptible to oscillations (sometimes referred to as "ringing") as charge can move in both directions through the device.

Some power supplies rely on "floating magnetics." Moreover, for safety concerns, it is relatively common practice to galvanically isolate high-voltage power supplies. A galvanically-isolated power supply has a higher possibility of developing a common-mode voltage offset due to switching parasitics, resulting in undesirable oscillations, which may lead to device failure.

SUMMARY

Embodiments herein soften the switching event of a transistor by reducing or eliminating oscillations in the circuit, by discharging parasitics prior to closing the switch. In one embodiment, circuitry includes a first discharge circuit that is coupled across a first switching device. A first control circuit, upon a first switch input signal transitioning from a disabled state to an enabled state, is adapted to cause the first discharge circuit to transition from a high impedance state to a discharge impedance state, and when a voltage across the first switching device drops below a first threshold value, cause the first switching device to transition from an off state to an on state. In this manner, the first control switch ensures parasitic voltages across the first switching device are eliminated, or reduced to a desired threshold, prior to switching the first switching device into the on state.

In one embodiment, the circuitry may include a second discharge circuit coupled across a second switching device, and a second control circuit. Upon a second switch input signal transitioning from the disabled state to the enabled state, the second control circuit is adapted to cause the second discharge circuit to transition from the high impedance state to the discharge impedance state, and when a voltage across the second switching device drops below a second threshold value, cause the second switching device to transition from the off state to the on state. The second switch input signal may transition from the disabled state to the enabled state at a first same time as the first switch input signal transitions from the disabled state to the enabled state. In such embodiment, when in the on state the first switching device couples the load to one terminal of a voltage source at the same time the second switching device couples the load to another terminal of the voltage source, and a current flows through the first switching device, the load, and the second switching device while the first switching device and the second switching device are in the on state. The first and second switching devices may comprise metal oxide semiconductor field-effect transistors (MOSFETs). The MOSFETs may comprise, by way of non-limiting example, Gallium Nitride (GaN) MOSFETs, Silicon Carbide (SiC) MOSFETs, or Silicon (Si) MOSFETs. In some embodiments, the first and second switching devices may couple a differential voltage in a range of 500 volts (V) to 1300V to the load. In some embodiments, the switch input signals may transition from the disabled state to the enabled state at a rate of about 100 kilohertz. The first and second switching devices may also comprise other suitable devices, including, for example, a junction gate field-effect transistor (JFET) or a high electron mobility transistor (HEMT).

The circuitry may also include third and fourth discharge circuits coupled respectively across third and fourth switching devices respectively. The third and fourth switching devices couple the load to a reverse differential voltage when the first and second switching devices are in the off state. A third control circuit, upon a third switch input signal transitioning from the disabled state to the enabled state, is adapted to cause the third discharge circuit to transition from the high impedance state to the discharge impedance state, and when a voltage across the third switching device drops below a third threshold value, cause the third switching device to transition from the off state to the on state. The third threshold value may comprise the same value as the first threshold values, or may comprise a different threshold value. A fourth control circuit, upon a fourth switch input signal transitioning from the disabled state to the enabled state, is adapted to cause the fourth discharge circuit to transition from the high impedance state to the discharge impedance state, and when a voltage across the fourth switching device drops below a fourth threshold value, cause the fourth switching device to transition from the off state to the on state, wherein the third switch input signal and the fourth switch input signal transition from the disabled state to the enabled state at a second same time that is different from the first same time.

Embodiments also include a process for implementing soft-switching. The process includes receiving, by a first control circuit at a first time, a first switch input signal to transition a first switching device from the off state to the on state. In response to the first switch input signal, a first discharge circuit that is coupled across a first switching device is caused to transition from the high impedance state to the discharge impedance state, and a voltage across the first switching device is determined to have dropped below a first threshold value. In response to the determination, the first switching device is caused to transition from the off state to the on state.

Among other advantages, the embodiments facilitate the use of switching devices, such as MOSFETs, in power converter applications that involve relatively high power, and relatively high switching frequencies, while reducing or eliminating oscillations that may damage the MOSFETs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
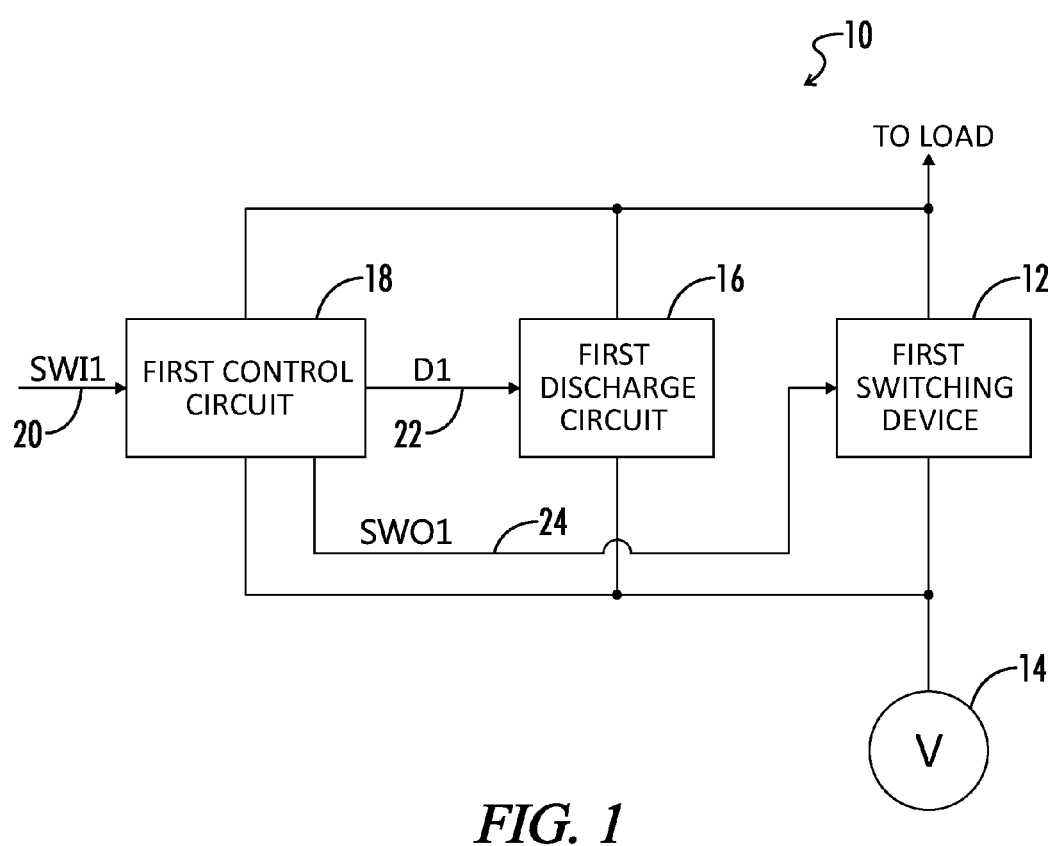
FIG. 1 is a block diagram of circuitry according to one embodiment.

FIG. 1 is a block diagram of circuitry 10 according to one embodiment. The circuitry 10 includes a first switching device 12 that couples a voltage source 14 to a load (not illustrated). The load may comprise, by way of non-limiting example, a motor. The use throughout the specification, including the claims and drawings, of ordinals in conjunction with an element is solely for convenience and for distinguishing what might otherwise be similar or identical labels, such as "first switching device" and "second switching device," and does not imply a priority, a type, an importance, or any other attribute, unless otherwise stated herein.

The first switching device 12 may comprise, by way of non-limiting example, a field-effect transistor, such as a metal oxide semiconductor field-effect transistor (MOSFET). The first switching device 12 may comprise, for example, a silicon carbide (SiC) MOSFET, a gallium nitride (GaN) MOSFET, or a Silicon (Si) MOSFET. The embodiments herein may facilitate relatively high frequency switching in relatively high power applications, including, but not limited to, applications wherein voltages range between 300 volts (V) and 1700V and switching frequencies are in a range between about 100 kilohertz (kHz) and 500 kHz, although the embodiments have applicability in applications wherein voltages are under 300V and in applications having switching frequencies less than 100 kHz or greater than 500 kHz as well. The first switching device 12 may also comprise any other suitable switching device, including, for example, a junction gate field-effect transistor (JFET) or a high electron mobility transistor (HEMT).

A first discharge circuit 16 is coupled across the first switching device 12. A first control circuit 18 is coupled to the first discharge circuit 16 and the first switching device 12. The first control circuit 18 is also capable of determining the voltage across the first switching device 12.

Figure 2:
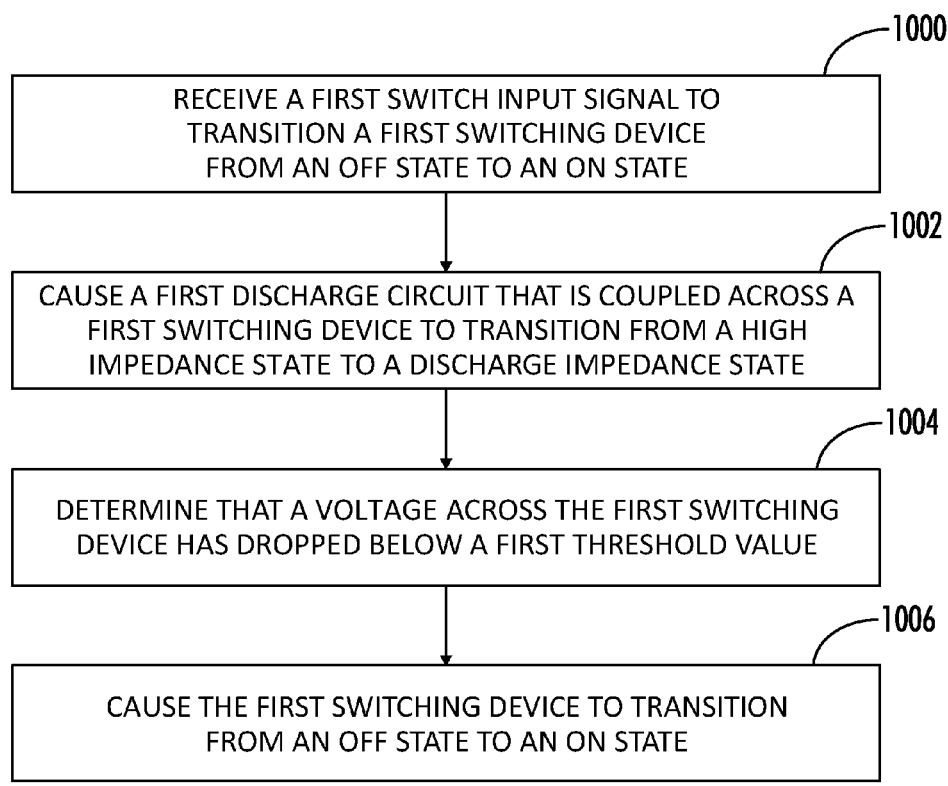
FIG. 2 is a flowchart of a process according to one embodiment.

FIG. 2 is a flowchart of a process according to one embodiment, and will be discussed in conjunction with FIG. 1. The first control circuit 18 receives a first switch input signal 20 (SWI1) that transitions from a disabled state to an enabled state (FIG. 2, block 1000). The enabled state may be indicated, for example, by a change in voltage from one level to another level. The first switch input signal 20 may be generated and sent at a desired frequency, such as 100 kHz. The transitioning of the first switch input signal 20 from the disabled state to the enabled state is interpreted by the first control circuit 18 as a direction to transition the first switching device 12 from an off state to an on state. The first control circuit 18, in response to the first switch input signal 20 transitioning from the disabled state to the enabled state, sends the first discharge circuit 16 a first discharge signal 22 (D1) to cause the first discharge circuit 16 to transition from a high impedance state to a discharge impedance state (FIG. 2, block 1002). While in the discharge impedance state, the first discharge circuit 16 may discharge parasitic voltages that have built up in the circuitry 10 to ensure that such parasitic voltages do not damage the first switching device 12 when the first switching device 12 is turned on (i.e., closed).

The first control circuit 18 determines that the voltage across the first switching device 12 has dropped below a first threshold value (FIG. 2, block 1004). The first control circuit 18 then sends the first switching device 12 a first switch output signal 24 (SWO1) to cause the first switching device 12 to transition from the off state to the on state (FIG. 2, block 1006). The first threshold value may comprise any desired voltage. In one embodiment, the first threshold value is in a range between about 20V and about 60V. The use herein of the term "about" in conjunction with a value means within 15% of the value.

Figure 3:
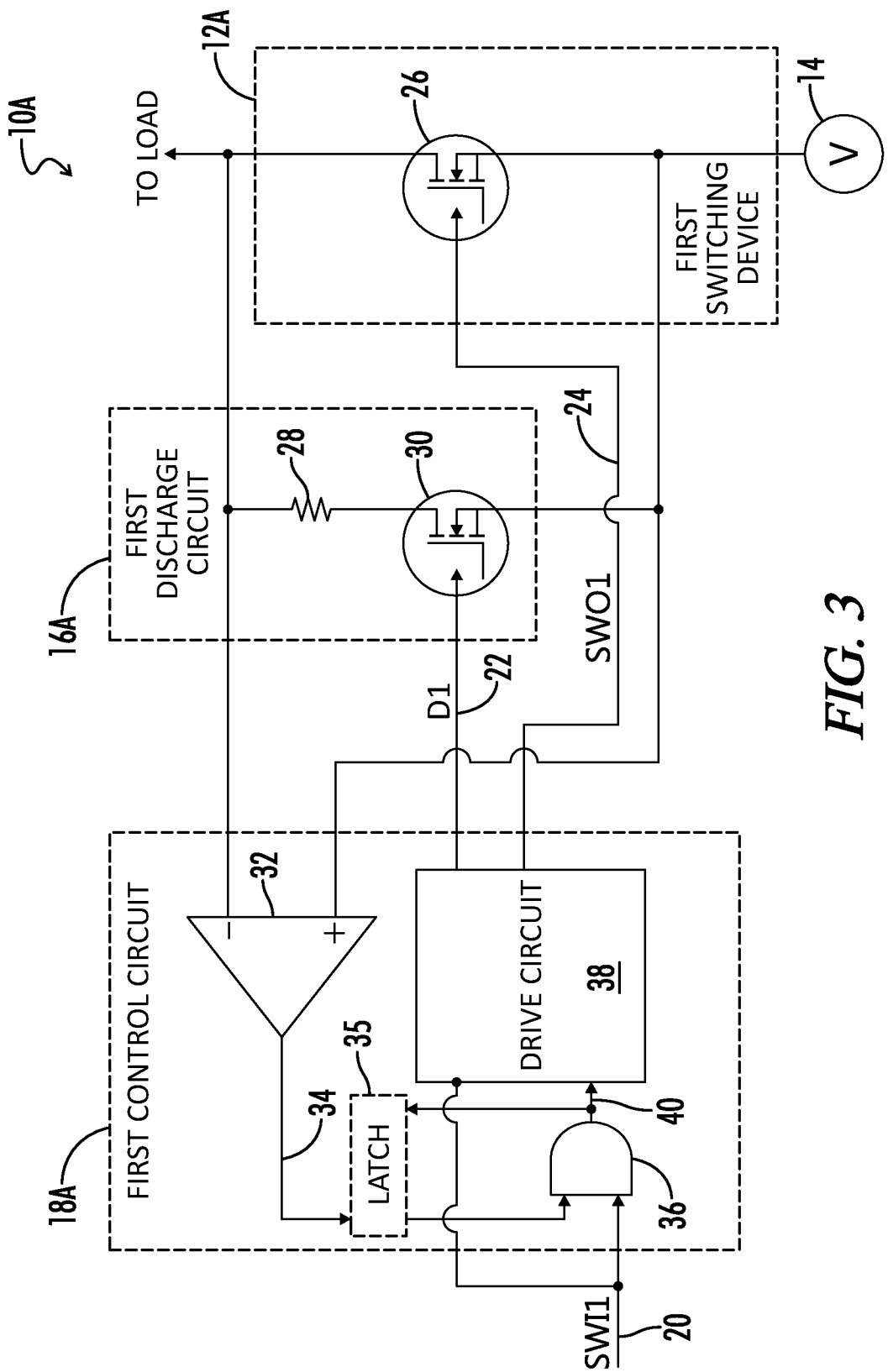
FIG. 3 is a schematic diagram of the circuitry illustrated in FIG. 1 according to one embodiment.

FIG. 3 is a schematic diagram of the circuitry 10 illustrated in FIG. 1 according to one embodiment. In this embodiment, circuitry 10A includes a first switching device 12A which includes an N-channel MOSFET 26 that couples the voltage source 14 to the load. While for purposes of illustration N-channel MOSFETs are illustrated, the embodiments are not limited to N-channel MOSFETs, and other suitable transistors may be used, such as, by way of non-limiting examples, P-channel MOSFETs, or junction field effect transistors (JFETs). In applications wherein the differential voltage across the load is less than about 600V, the N-channel MOSFET 26 may comprise, for example, a GaN MOSFET. In applications wherein the differential voltage across the load is more than about 600V, and less than about 1700V, the N-channel MOSFET 26 may comprise, for example, a SiC MOSFET.

A first discharge circuit 16A is, in one embodiment, coupled in parallel with the first switching device 12A, and comprises a resistor 28 coupled in series with a transistor 30. In some embodiments, the first switch input signal 20 transitions to the on state in conjunction with a zero voltage event across the load, and thus, the parasitic voltages being discharged by the first discharge circuit 16A may have a relatively low amount of power, and thus may not need to handle the amount of power handled by the first switching device 12A. In one embodiment, the resistor 28 may have a resistance in a range of between about 1 ohm to about 50 ohms, the resistance being based in part on the amount of parasitic capacitance within the circuitry 10A and the overall switching frequency. The transistor 30 may comprise, for example, a MOSFET or JFET. It will be apparent that the first discharge circuit 16A may comprise any circuitry, including any combination of electrical components, suitable for discharging parasitic voltages that exist in the circuitry 10A.

A first control circuit 18A includes a comparator 32 that is adapted to determine the voltage across the first switching device 12A, and to output a comparator drive signal 34 when the voltage across the first switching device 12A drops below the first threshold value. In some embodiments, a latch 35 may hold the logic state if noise is introduced into the circuitry 10A, such as by the first switching device 12A, or any other device or components. The latch 35 may comprise a discrete device or may be incorporated into the functionality of another device or component, such as the comparator 32 for example.

The first control circuit 18A may also include one or more logic gates 36 coupled to the comparator 32 and to the first switch input signal 20. While the logic gate 36 is illustrated as an AND gate, it will be apparent that other logic gates, or combinations of logic gates, may be utilized. In this embodiment, a drive circuit 38 may receive the first switch input signal 20, and in response thereto, send the first discharge circuit 16A the first discharge signal 22 to close the transistor 30 and transition the first discharge circuit 16A from the high impedance state to the discharge impedance state to begin discharging the parasitics in the circuitry 10A. After the comparator 32 determines that the voltage across the first switching device 12A has dropped below the first threshold value, the comparator 32 sends the comparator drive signal 34 to the logic gate 36. The logic gate 36 then sends a control signal 40 to the drive circuit 38, indicating to the drive circuit 38 that the voltage across the first switching device 12A has dropped below the first threshold value. In response, the drive circuit 38 sends the first switch output signal 24 to the first switching device 12A to cause the N-channel MOSFET 26 to transition to the on state. After a period of time, the drive circuit 38 may initiate additional signals to transition the first discharge circuit 16A to the high impedance state and the first switching device 12A to the off state at substantially a same instant in time.

Figure 4:
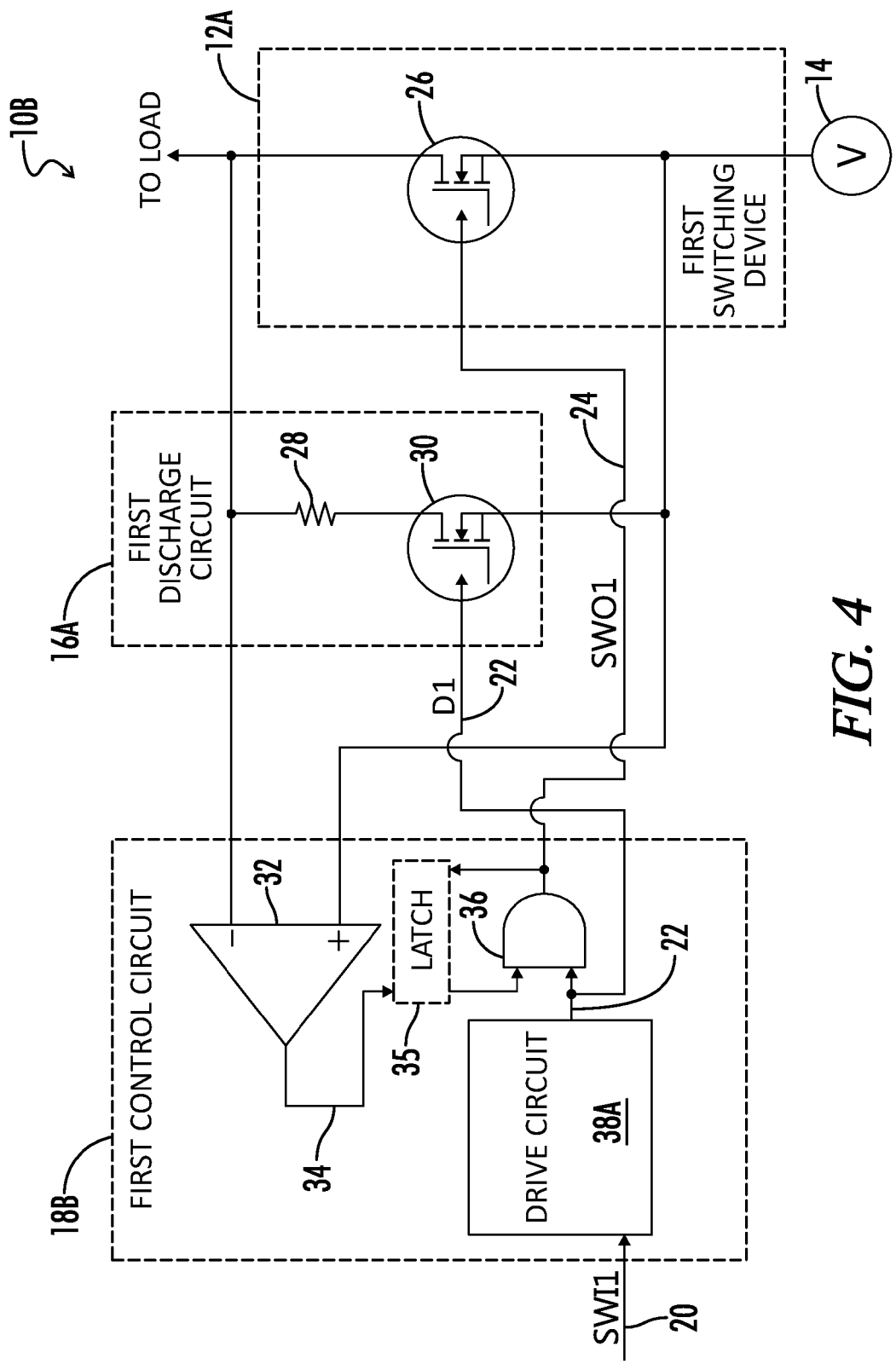
FIG. 4 is a schematic diagram of the circuitry illustrated in FIG. 1 according to another embodiment.

FIG. 4 is a schematic diagram of the circuitry illustrated in FIG. 1 according to another embodiment. Circuitry 10B includes the first switching device 12A coupled in parallel with the first discharge circuit 16A. In this embodiment, however, a first control circuit 18B includes a drive circuit 38A that receives the first switch input signal 20, and in response thereto, outputs the first discharge signal 22 to both the first discharge circuit 16A and the logic gate 36. The logic gate 36 is also coupled to the comparator 32. The first discharge signal 22 closes the transistor 30 and transitions the first discharge circuit 16A from the high impedance state to the discharge impedance state to begin discharging the parasitic voltages in the circuitry 10B. After the comparator 32 determines that the voltage across the first switching device 12A has dropped below the first threshold value, the comparator 32 sends the comparator drive signal 34 to the logic gate 36. The logic gate 36 then sends the first switch output signal 24 to the first switching device 12A to cause the N-channel MOSFET 26 to transition to the on state.

Because gate timing is not dependent upon field programmable gate array (FPGA) or analog/digital timing, the embodiments facilitate relatively high-speed switching frequencies. Moreover, the embodiments enable zero-voltage switching to operate with a higher fidelity than may be available with a digital controller.

Figure 5:
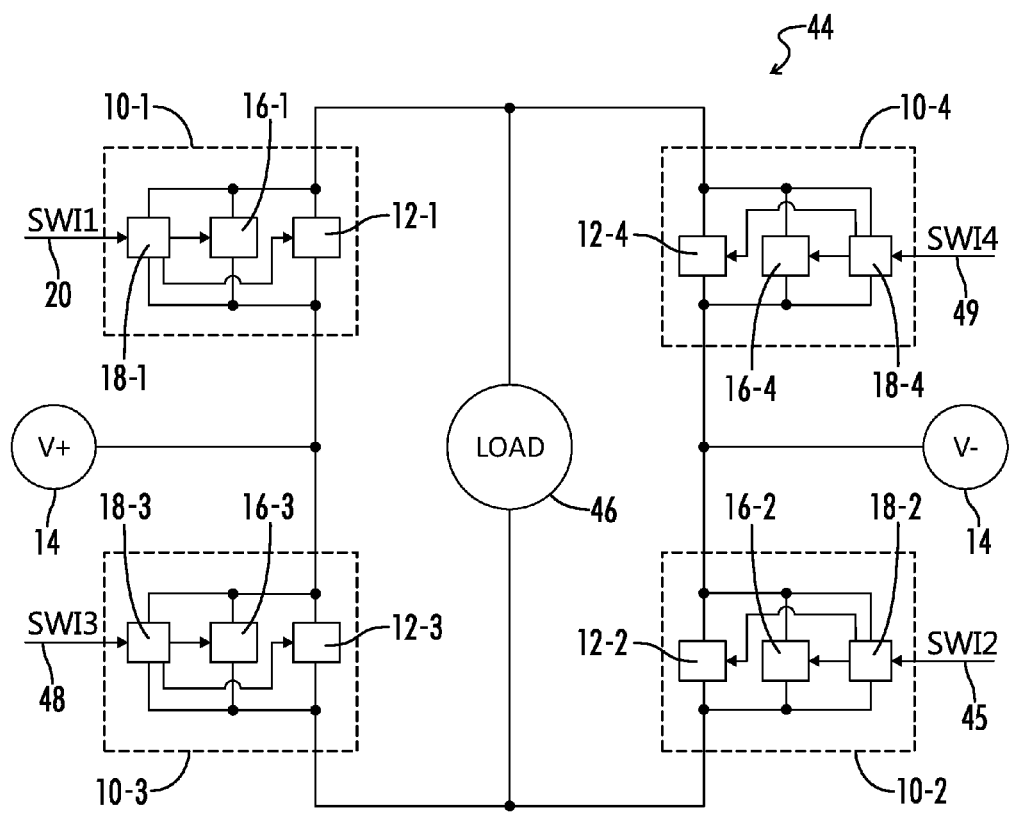
FIG. 5 is a block diagram illustrating a system in which embodiments may be utilized.

FIG. 5 is block diagram illustrating a system 44 in which embodiments may be utilized. The system 44 includes circuitry 10-1, which includes a first switching device 12-1, a first discharge circuit 16-1 coupled across the first switching device 12-1, and a first control circuit 18-1. The first control circuit 18-1, upon the first switch input signal 20 transitioning from the disabled state to the enabled state, is adapted to cause the first discharge circuit 16-1 to transition from the high impedance state to the discharge impedance state, and when the voltage across the first switching device 12-1 drops below a first threshold value, cause the first switching device 12-1 to transition from the off state to the on state. The first switching device 12-1 couples the voltage source 14 to a load 46 when in the on state.

Circuitry 10-2 includes a second switching device 12-2, a second discharge circuit 16-2 coupled across the second switching device 12-2, and a second control circuit 18-2. The second control circuit 18-2, upon a second switch input signal 45 (SWI2) transitioning from the disabled state to the enabled state, is adapted to cause the second discharge circuit 16-2 to transition from the high impedance state to the discharge impedance state, and when the voltage across the second switching device 12-2 drops below a second threshold value, cause the second switching device 12-2 to transition from the off state to the on state. The second threshold value may comprise the same value as the first threshold value, or may comprise a different threshold value. The second switching device 12-2 couples the voltage source 14 to the load 46 when in the on state. When the first switching device 12-1 and the second switching device 12-2 are simultaneously in the on state, a current flows through the first switching device 12-1, the load 46, and the second switching device 12-2. The second switch input signal 45 may comprise the same signal as the first switch input signal 20, or a different signal that is timed with respect to the first switch input signal 20.

Circuitry 10-3 includes a third switching device 12-3, a third discharge circuit 16-3 coupled across the third switching device 12-3, and a third control circuit 18-3. The third control circuit 18-3, upon a third switch input signal 48 (SWI3) transitioning from the disabled state to the enabled state, is adapted to cause the third discharge circuit 16-3 to transition from the high impedance state to the discharge impedance state, and when the voltage across the third switching device 12-3 drops below a third threshold value, cause the third switching device 12-3 to transition from the off state to the on state.

Circuitry 10-4 includes a fourth switching device 12-4, a fourth discharge circuit 16-4 coupled across the fourth switching device 12-4, and a fourth control circuit 18-4. The fourth control circuit 18-4, upon a fourth switch input signal 49 (SWI4) transitioning from the disabled state to the enabled state, is adapted to cause the fourth discharge circuit 16-4 to transition from the high impedance state to the discharge impedance state, and when the voltage across the fourth switching device 12-4 drops below a fourth threshold value, cause the fourth switching device 12-4 to transition from the off state to the on state. The fourth threshold value may comprise the same value as the first threshold value, or may comprise a different threshold value. The fourth switch input signal 49 may comprise the same signal as the first switch input signal 20, or a different signal that is timed with respect to the first switch input signal 20.

Figure 6:
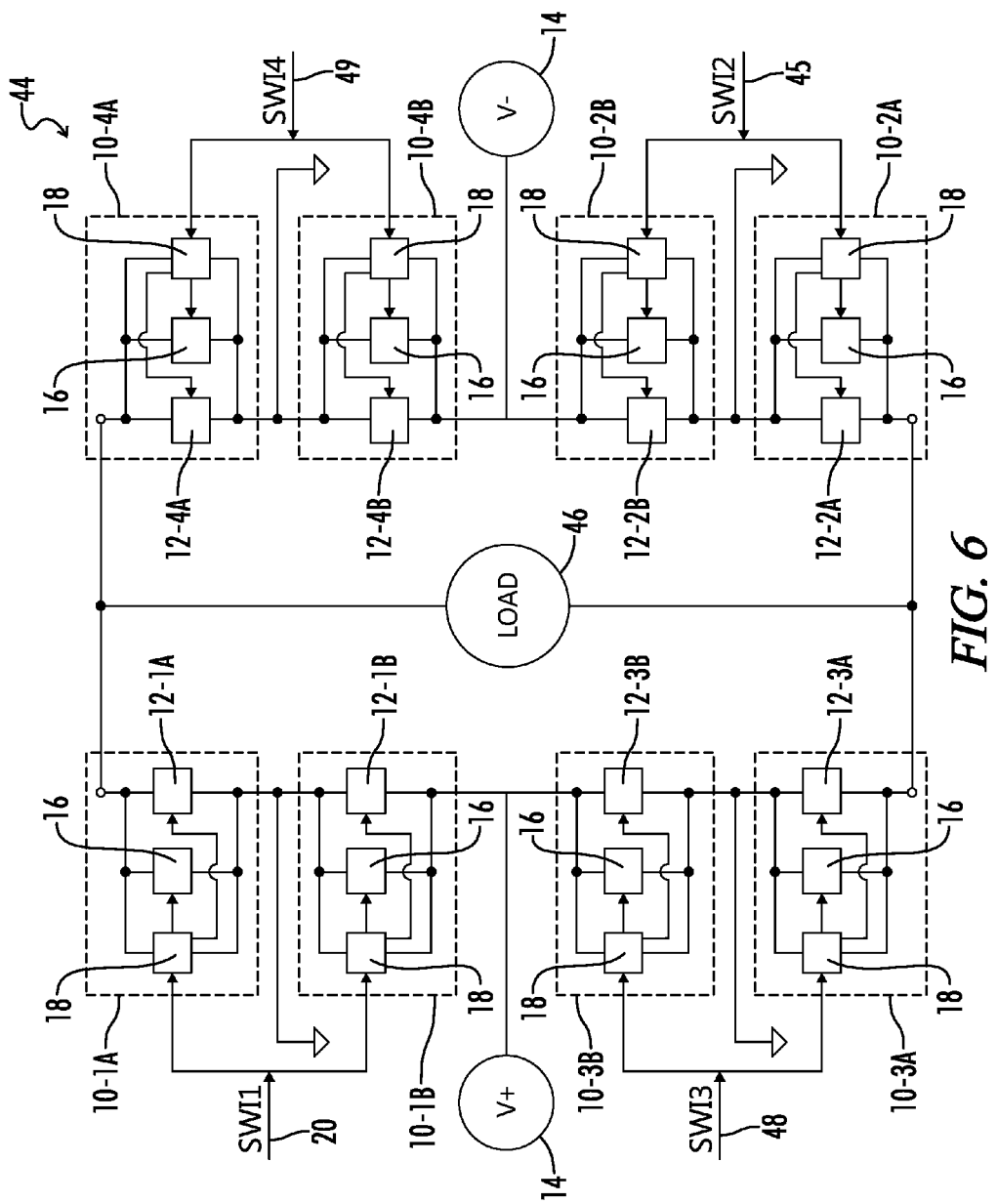
FIG. 6 is a block diagram illustrating a system in which other embodiments may be utilized.

FIG. 6 is block diagram illustrating a system 50 in which other embodiments may be utilized. The system 50 operates substantially similarly to the system 44 illustrated in FIG. 5, however in this embodiment pairs of switching devices 12 are utilized to permit current flow in both directions. In particular, circuitry 10-1A and 10-1B include respective switching devices 12-1A and 12-1B arranged in a common source configuration, thereby permitting current flow through switching devices 12-1A and 12-1B in either direction. Circuitry 10-2A and 10-2B include respective switching devices 12-2A and 12-2B arranged in a common source configuration, thereby permitting current flow through switching devices 12-2A and 12-2B in either direction. Circuitry 10-3A and 10-3B include respective switching devices 12-3A and 12-3B arranged in a common source configuration, thereby permitting current flow through switching devices 12-3A and 12-3B in either direction. Circuitry 10-4A and 10-4B include respective switching devices 12-4A and 12-4B arranged in a common source configuration, thereby permitting current flow through switching devices 12-4A and 12-4B in either direction. Circuitry 10-1A, 10-1B, 10-2A, 10-2B, 10-3A, 10-3B, 10-4A, and 10-4B each include respective discharge circuits 16 and control circuits 18 to facilitate discharge of parasitic voltages prior to closing the respective switches, as discussed previously.

While for purposes of clarity, only certain components are discussed herein with regard to FIGS. 1 and 3-6, it will be apparent that the circuitry disclosed in such figures may include any additional or other number of electrical components, including components for stepping up or down voltages as appropriate. The embodiments have applicability in a number of different applications, including, by way of non-limiting examples, alternating current link resonators, devices having a common H-bridge, devices using an H-bridge as a motor driver, and the like.

Those skilled in the art will recognize improvements and modifications to the preferred embodiments of the present disclosure. All such improvements and modifications are considered within the scope of the concepts disclosed herein and the claims that follow.

What is claimed is:

1. Soft-switching gate control circuitry comprising:
 a first discharge circuit coupled across a first switching device; and
 a first control circuit, upon a first switch input signal transitioning from a disabled state to an enabled state, adapted to:
  cause the first discharge circuit to transition from a high impedance state to a discharge impedance state to reduce a voltage across the first switching device; and
  when the voltage across the first switching device drops below a first threshold value, cause the first switching device to transition from an off state to an on state.

2. The circuitry of claim 1, further comprising:
 a second discharge circuit coupled across a second switching device;
 a second control circuit, upon a second switch input signal transitioning from a disabled state to an enabled state, adapted to:
  cause the second discharge circuit to transition from a high impedance state to a discharge impedance state to reduce a voltage across the second switching device; and
  when the voltage across the second switching device drops below a second threshold value, cause the second switching device to transition from an off state to an on state,
 wherein the second switch input signal transitions from the disabled state to the enabled state at a first same time as the first switch input signal transitions from the disabled state to the enabled state.

3. The circuitry of claim 2, wherein the first switching device is coupled to a load, the second switching device is coupled to the load, and wherein a current flows through the first switching device, the load, and the second switching device when the first switching device and the second switching device are in the on state.

4. The circuitry of claim 3, wherein in the on state, the first switching device and the second switching device couple a differential voltage in a range of 500V to 1300V to the load.

5. The circuitry of claim 2, further comprising:
 third and fourth discharge circuits coupled respectively across third and fourth switching devices respectively;
 a third control circuit, upon a third switch input signal transitioning from the disabled state to the enabled state, adapted to:
  cause the third discharge circuit to transition from the high impedance state to the discharge impedance state to reduce a voltage across the third switching device; and
  when the voltage across the third switching device drops below a third threshold value, cause the third switching device to transition from the off state to the on state;
 a fourth control circuit, upon a fourth switch input signal transitioning from the disabled state to the enabled state, adapted to:
  cause the fourth discharge circuit to transition from the high impedance state to the discharge impedance state to reduce a voltage across the fourth switching device; and
  when the voltage across the fourth switching device drops below a fourth threshold value, cause the fourth switching device to transition from the off state to the on state;
 wherein the third switch input signal and the fourth switch input signal transition from the disabled state to the enabled state at a second same time that is different from the first same time.

6. The circuitry of claim 1, wherein the first discharge circuit comprises a field effect transistor coupled in series with a resistor.

7. The circuitry of claim 6, wherein the field effect transistor and the resistor are coupled in parallel with the first switching device.

8. The circuitry of claim 1, further comprising the first switching device, wherein the first switching device comprises a metal oxide semiconductor field-effect transistor (MOSFET).

9. The circuitry of claim 8, wherein the MOSFET comprises one of a Gallium Nitride (GaN) MOSFET, a Silicon Carbide (SiC) MOSFET, and a Silicon (Si) MOSFET.

10. The circuitry of claim 1, further comprising the first switching device, wherein the first switching device comprises one of a junction gate field-effect transistor (JFET) and a high electron mobility transistor (HEMT).

11. The circuitry of claim 1, wherein subsequent to causing the first switching device to transition from the off state to the on state, the first control circuit is further adapted to transition the first discharge circuit to the high impedance state and the first switching device to an off state at substantially a same instant in time.

12. The circuitry of claim 1, wherein the first threshold value is in a range between 20 volts and 60 volts.

13. The circuitry of claim 1, wherein the first switch input signal transitions from the disabled state to the enabled state repeatedly at a rate greater than 100 kilohertz.

14. The circuitry of claim 1, further comprising a comparator adapted to determine the voltage across the first switching device, and to output a comparator drive signal when the voltage across the first switching device drops below the first threshold value.

15. The circuitry of claim 14, further comprising a logic gate coupled to the comparator, the logic gate configured to cause the first discharge circuit to transition from the high impedance state to the discharge impedance state in response to receiving the comparator drive signal and the first switch input signal.

16. Soft-switching gate control circuitry comprising:
a first discharge circuit coupled across a first switching device; and
a first control circuit coupled to the first discharge circuit and to the first switching device, and adapted to:
receive a first input signal for transitioning the first switching device from an off state to an on state;
in response to the first input signal, cause the first discharge circuit to transition from a high impedance state to a discharge impedance state to reduce a voltage across the first switching device;
in response to determining that the voltage across the first switching device drops below a first threshold value, cause the first switching device to transition from the off state to the on state.

17. The circuitry of claim 16, further comprising:
a second discharge circuit coupled across a second switching device;
a second control circuit coupled to the second discharge circuit and to the second switching device, and adapted to:
receive a second input signal for transitioning the second switching device from an off state to an on state;
in response to the second input signal, cause the second discharge circuit to transition from a high impedance state to a discharge impedance state to reduce a voltage across the second switching device;
in response to determining that the voltage across the second switching device drops below a second threshold value, cause the second switching device to transition from the off state to the on state.

18. The circuitry of claim 16, further comprising the first switching device, wherein the first switching device comprises a metal oxide semiconductor field-effect transistor (MOSFET).

19. A method for soft-switching gate control, comprising:
receiving, by a first control circuit at a first time, a first switch input signal to transition a first switching device from an off state to an on state;
in response to the first switch input signal, causing a first discharge circuit that is coupled across the first switching device to transition from a high impedance state to a discharge impedance state to reduce a voltage across the first switching device;
determining that the voltage across the first switching device has dropped below a first threshold value; and
in response to determining that the voltage across the first switching device has dropped below the first threshold value, causing the first switching device to transition from the off state to the on state.

20. The method of claim 19, further comprising:
receiving, by a second control circuit at the first time, a second switch input signal to transition a second switching device from the off state to the on state;
in response to the second switch input signal, causing a second discharge circuit that is coupled across the second switching device to transition from the high impedance state to the discharge impedance state to reduce a voltage across the second switching device;
determining that the voltage across the second switching device has dropped below a second threshold value; and
in response to determining that the voltage across the second switching device has dropped below the second threshold value, causing the second switching device to transition from the off state to the on state.

* * * * *

UNITED STATES PATENT AND TRADEMARK OFFICE
CERTIFICATE OF CORRECTION

| | |
|---|---|
| PATENT NO. | : 9,293,284 B1 |
| APPLICATION NO. | : 13/682227 |
| DATED | : March 22, 2016 |
| INVENTOR(S) | : Gregory Romas et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this
Twenty-sixth Day of July, 2016

Michelle K. Lee
*Director of the United States Patent and Trademark Office*